Aug. 29, 1944.    F. C. BLANCHA    2,356,914
COUNTING MECHANISM
Filed May 1, 1943    2 Sheets-Sheet 1

Inventor
Felix C. Blancha
By
C. D. Tucker
Attorney

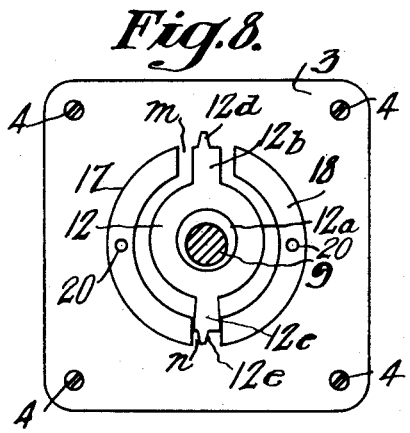
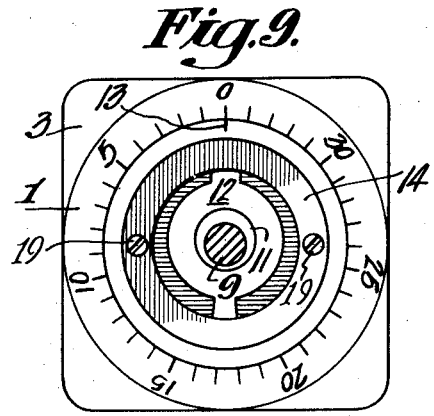
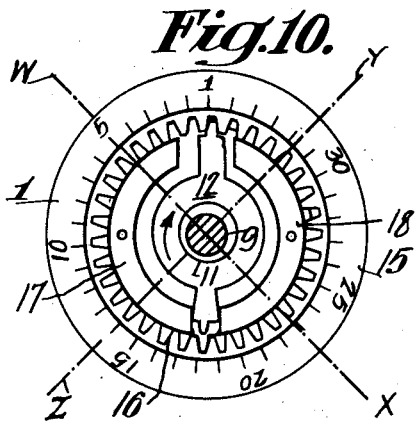
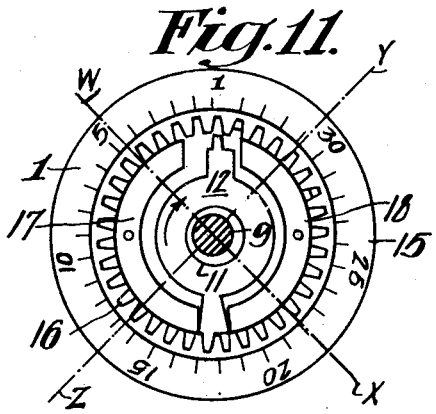
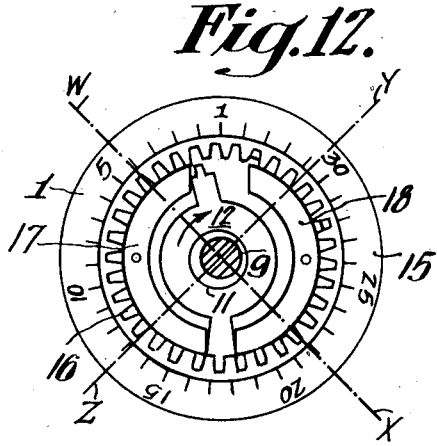
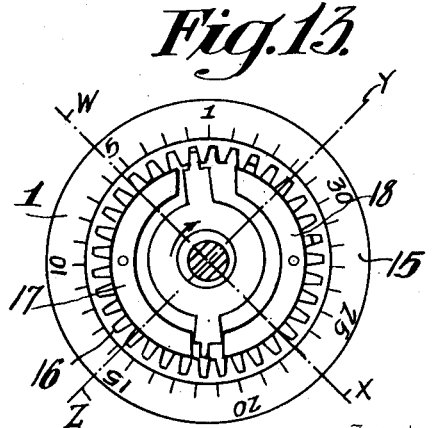

Patented Aug. 29, 1944

2,356,914

UNITED STATES PATENT OFFICE 2,356,914

COUNTING MECHANISM

Felix C. Blancha, Manoa, Pa., assignor to Radio Corporation of America, a corporation of Delaware Application May 1, 1943, Serial No. 485,396

6 Claims. (Cl. 74—116)

This invention relates to an improved dial mechanism for counting and indicating the number of revolutions and fractions of a revolution of a shaft, such, for example, as the tuning shaft of a radio transmitter or the like.

The principal object of the present invention is to provide a reliable and trouble-free counting mechanism, and one nevertheless characterized by the simplicity and economy of its parts.

Another object of the present invention is to provide an inexpensive mechanical movement for counting devices and the like, and one wherein the driving and driven elements are at all times in positive mechanical engagement, whereby slippage and uncounted cycles are obviated.

Still another object of the invention is to provide an improved plural scale indicator wherein the setting of the main scale remains fixed throughout the greater portion (say, 270°) of each operating cycle of the auxiliary or "fractional revolution scale," whereby a rapid and accurate reading of both scales is ensured.

Figure 1:
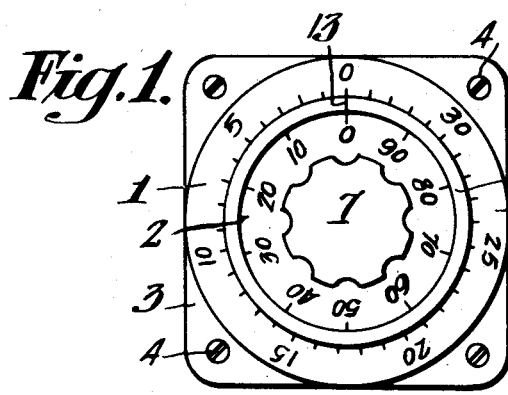
Figure 2:
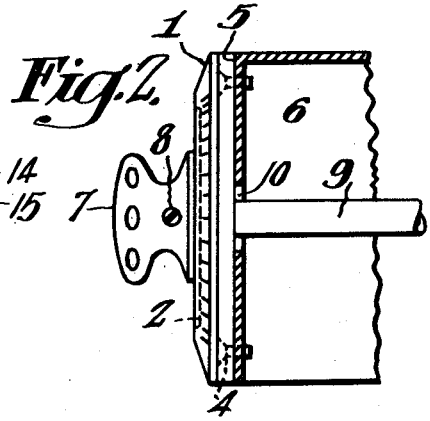
Figure 3:
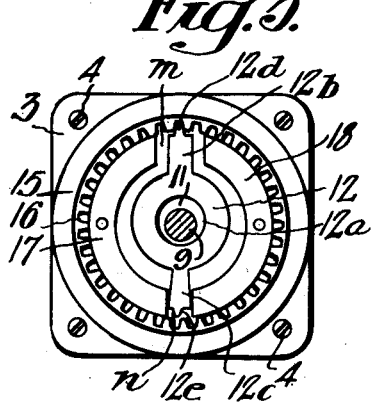
Figure 4:
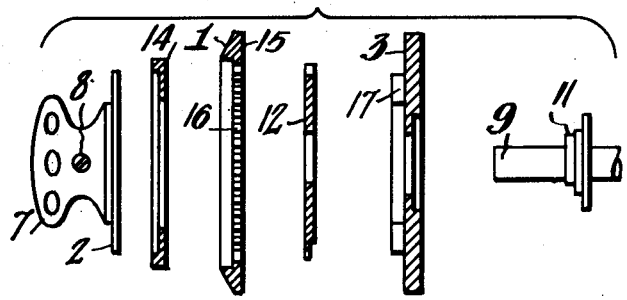
Figure 5:
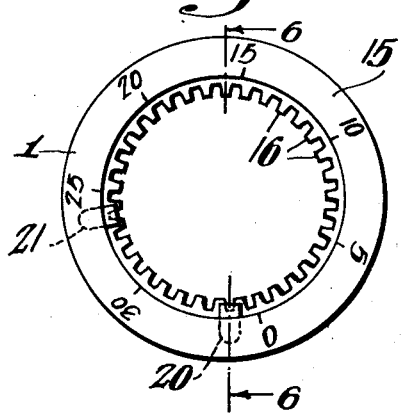
Figure 6:
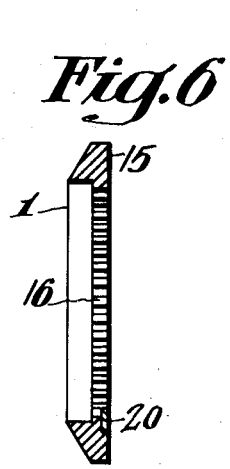
Figure 7:
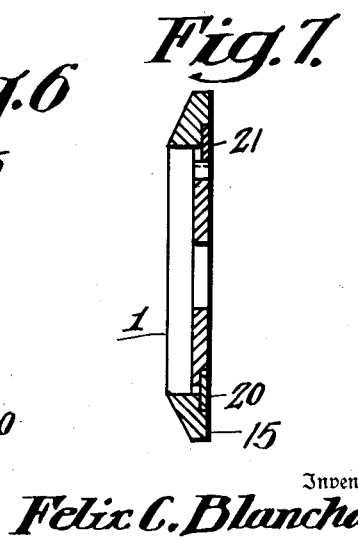

Certain details of construction together with other objects and advantages will be apparent and the invention itself will be best understood by a reference to the following specification and to the accompanying drawings, wherein:

Fig. 1 is a front elevational view of a plural scale counting device incorporating the invention, Fig. 2 is a side elevation partly in section showing the counter applied to the tuning shaft of a radio apparatus, Fig. 3 is a front elevation of the device of Figs. 1 and 2 with the knob and central scale removed to reveal its drive mechanism, Fig. 4 is an exploded view, partly in section, showing the several parts of the device, Fig. 5 is a front elevational view of the internal gear upon which the main scale is marked, Fig. 6 is a sectional view taken on the line 6—6 of Fig. 5 and Fig. 7 is a sectional view taken on the line 7—7 of Fig. 5, Fig. 8 is a front elevational view, with the gear of Fig. 5 removed, and revealing the gear support and the cam actuated rocker by which the said gear is rotated, Fig. 9 is a front elevational view showing the internal gear and its clamping ring in position, and Figs. 10 to 13, inclusive, are front elevational views similar to Fig. 3 showing successive 90° stages of a complete operating cycle of the counter of the invention.

Like reference characters designate the same parts in all figures.

The plural scale counter or dial which has been selected for illustration comprises a main scale 1 and an auxiliary scale 2 which are assembled, in a manner later described, upon a backing plate 3 which is shown in Fig. 2 attached by means of screws 4, to the front panel 5 of a radio chassis or cabinet 6. A knob 7 which forms part of the dial assembly is attached by means of a set screw 8 to the free end of a control shaft 9 which extends through a suitable bushing or aperture 10 in the front panel 5.

The tuning device controlled by the shaft 9 is not here shown but it may comprise an inductance coil and trolley arrangement similar to the one shown, by way of example, in U. S. Patent No. 2,178,221 to F. C. Blancha. In this event the plural scale dial here illustrated operates to show the number of full and fractional revolutions of the tuning shaft required to move the trolley from its "zero setting," at one end of the coil, to a position whereat the desired variation in inductance is achieved.

The fractional revolutions of the shaft 9 are indicated by the auxiliary decimal scale 2 which, as shown in Fig. 4, may comprise a skirt on the inner end of the control knob 7. The full revolutions are indicated on the surrounding main scale 1, which is rotated, in a manner later described, by means of a cam 11 and a cam follower or rocker 12 arranged on and about the tuning shaft 9. The indicia on both the main scale 1 and on the auxiliary scale 2 are read in conjunction with a stationary pointer or reference line 13 marked on an immovable clamping ring 14 between the two scales.

As shown more clearly in Fig. 5, the main scale 1 is marked on the exposed face of an annulus 15 which is provided with gear teeth 16 on its inner perimeter. This internal gear 15 is supported internally by a "split ring" comprising a pair of spaced apart, smooth surfaced, arcuate protuberances or risers 17 and 18 which are arranged on the front surface of the plate 3 on opposite sides of the circular aperture through which the control shaft 9 extends.

As previously indicated, the scale bearing annulus or gear 15 is rotated on its bi-part internal support 17, 18, by means of a cam-actuated rocker 12. The cam 11 that moves the rocker 12 comprises a circular member mounted off-center on the shaft 9, and the rocker 12 has a centrally located aperture 12a within which the said cam has a bearing-fit. Thus, upon rotation of the shaft 9 the cam 11 tends to impart an epicyclic movement to the rocker 12. However, as will hereinafter more fully appear, the unique shape and arrangement of the rocker 12 causes the driving force, which is imparted thereto by the cam 11, to be converted into an eccentric, reciprocating or "rocking" movement which serves to drive the gear 15 in discrete steps instead of with the continuous motion characteristic of a true epicyclic movement.

The construction required to provide the described movement is shown in Fig. 3: The rocker 12 is provided with a pair of outwardly extending oppositely located spokes or arms 12b and 12c, each of which terminates in a tooth or finger 12d and 12e, respectively. The diameter of the rocker as measured along its arms is slightly less than the root diameter of the gear 15 and preferably corresponds to the pitch diameter of the gear 15, minus the "throw" of the cam 11. Thus, should the finger 12e on the arm 12c fall in the interdental space between two of the gear teeth 16, the opposite finger 12d on the arm 12b will at the same time be drawn out of engagement with the teeth at the opposite side of the gear 15.

It will be observed upon inspection of Figs. 3 and 8 that the two diametrically opposite spaces m and n between the adjacent ends of the arcuate risers 17 and 18, and between which the ends of the rocker arms 12b and 12c are confined, respectively, are not of the same dimensions. That is to say, the "upper" space m is here shown as slightly wider than three of the gear teeth 16, while the lower space n is spanned by but two teeth. The maximum width of the "lower" rocker arm 12c corresponds substantially to the width of the space n within which it is confined; hence, it cannot move either in a clockwise or counter-clockwise direction, but only radially, into and out of engagement with the gear tooth with which it is in register. In undergoing such movement, however, its tapered sides permit of its being tilted slightly either to the left or to the right, as on a pivot. The upper rocker arm 12b, on the other hand, is not limited to a simple reciprocating movement but may be moved in a clockwise or in counterclockwise direction (about 12e as a pivot) within the relatively wider space m defined by the "upper" ends of the cam supports 17 and 18.

Before proceeding with a detailed description of how the cam-actuated rocker 12 drives the scale-bearing internal gear 15, attention is called to the fact that the rocker is maintained upon the cam 11 by means of the clamping ring 14. This ring 14 fits within a recess, provided for the purpose, in the front surface of the gear 15 and is secured to the back plate 3 by means of two screws 19 (Fig. 9) which enter complementarily threaded holes 20 (Fig. 8) in the risers 17 and 18 upon which the gear 15 rotates.

In a conventional counting mechanism wherein the relative movement between the scale and the pointer comprises a continuous movement there is a very real chance that the operator may misread the scale when the pointer is part way between two adjacent indicia. This hazard is greatly reduced when the counter of the present invention is employed since the main scale 1 remains stationary throughout 270° of the operating cycle and, during the last quarter-cycle, moves very rapidly to a position whereat the next indicia is in register with the pointer 13. Why this is so will be apparent from the following analysis of a complete operating cycle, as pictured in Figs. 10 to 13, inclusive. These drawings are marked with two reference lines W—X, Y—Z which intersect at right angles to indicate four quarter-cycles of movement.

In Fig. 10 the rocker 12 is shown in a position whereat it has already advanced the main scale from its zero (0) gradation to the first decimal marking, 1. In this position the maximum rise of the cam 11 lies along the line Y—Z and the finger 12d on the end of the "upper" rocker arm 12b is still fully engaged, but ready to be withdrawn from engagement, with the gear teeth during the next 90° of rotation of the control shaft 9.

In Fig. 11 the cam 11 has been rotated (in a clockwise direction) 90° from the position shown in Fig. 10. It will be noted that the indicia (1) on the scale 1 remains in register with the pointer 13. Here the rise of the cam lies along the line W—X. At this moment the finger 12d on the end of the upper rocker arm 12b has been withdrawn from the gear teeth 16 and the finger 12e on the lower arm 12c has dropped into engagement with the gear teeth adjacent thereto.

In Fig. 12 the cam 11 has been rotated, in the same direction, 90° from the position shown in Fig. 11 and its maximum rise lies along the line Y—Z. Here again it will be noted that the pointer 13 still is in register with the mark 1 on the scale 1. During this 90° rotation of the shaft 9 the lower finger 12e remains in engagement with the gear teeth 16 and the rocker has been pivoted to the left so that its "upper" finger 12d is ready to engage the tooth next succeeding the one from which it was disengaged in Fig. 11.

In Fig. 13 the shaft 9 has been rotated 270° from the position shown in Fig. 10 and the pointer 13 still remains in register with the first scale mark (1). During this last 90° rotation, here shown, the cam 11 has been moved to a position whereat its maximum rise is along the line X—W, and the rocker 12 has been moved by the cam to a position whereat its lower finger 12e has been disengaged and its upper finger 12d moved into driving relation with the interdental space with which it is in register in Fig. 12. It will now be apparent that it is only during the next 90° of rotation (shown in Fig. 10) that the scale per se rotates, to bring its next mark (2) into register with the pointer.

Attention is called to the fact that at all times during the above described 360° cycle of rotation, one or the other of the fingers 12d or 12e is positively engaged by the teeth 16 on the gear 15. Hence, the shaft 9 cannot be rotated 360° without such full cycle of rotation being evidenced by the indicia of the main scale 1. Since the auxiliary scale 2 is coupled directly to the shaft 9, a fractional revolution will be accurately indicated on that scale.

One very real advantage of the device of the present invention remains to be pointed out. In a conventional epicyclic movement employing driving and driven gear wheels, all of the teeth on both wheels are used during each revolution; thus, when it is desired to provide an indication of the limit of movement of the controlled device it is necessary to provide the device with an auxiliary stop mechanism. Since the mechanism of the present invention dispenses with the use of a driving gear and employs but a single driving "finger", any tooth on the driven gear 15 may be suitably blocked to provide a stop for the shaft 9. Thus, as shown in Figs. 5, 6 and 7, two teeth on the driven gear are "blocked" as indicated at 20, 21 to limit the rotation of the control shaft within the limits of zero to twenty-five full revolutions of the shaft.

Various other embodiments and applications of the invention will suggest themselves to those skilled in the art to which the invention appertains. Accordingly, the foregoing description of a typical embodiment and application of the invention should be interpreted as illustrative and not in a limiting sense except as required by the prior art and by the spirit of the appended claims.

I claim as my invention:

1. A device of the character described comprising a base, a split ring on said base, an internal gear supported on its inner perimeter on said split ring for rotation, a cam and a cam follower mounted for eccentric movement adjacent to the center of said split ring, said cam follower having an arm which extends into said split and of a length sufficient to be moved into and out of driving engagement with the portion of said gear which lies adjacent to said split when said cam follower is actuated by said cam, and means for actuating said cam.

2. The invention as set forth in claim 1 and wherein said split ring is provided with a second diametrically opposite split and said cam follower is provided with a second oppositely extending arm which terminates within said second split, the overall length of said cam follower as measured along said arms being such that said second arm is in engagement with said gear when said first mentioned arm is disengaged, whereby undesired rotation of said gear is prevented.

3. A device of the character described comprising a base, a pair of opposed arcuate members arranged about a common center on said base, an internal gear supported on its inner perimeter on said arcuate members for rotation, the ends of said arcuate members being spaced from each other at circumferentially spaced points to provide two diametrically opposite spaces between the adjacent of said ends, a cam follower comprising a pair of oppositely extending arms of an overall length slightly less than the root diameter of said internal gear, said arms terminating respectively within said oppositely located spaces and each adapted to engage said gear, and cam means for imparting a reciprocating movement to said cam follower whereby the oppositely extending arms thereof are presented, sequentially, to the portions of said gear which lie within the boundaries of said spaces.

4. The invention as set forth in claim 3 and wherein each of said cam follower arms terminates in a projection which is adapted to be entered into and withdrawn from the interdental spaces on said gear when said cam follower is subjected to said reciprocating movement.

5. The invention as set forth in claim 3 and wherein the overall length of said cam follower corresponds substantially to the pitch diameter of said gear, minus the throw of said cam, whereby when said cam follower is subjected to said reciprocating movement at least one of said arms is at all times in engagement with said gear.

6. The invention as set forth in claim 3 and wherein one of said diametrically opposite spaces is of a width corresponding substantially to the width of the arm which moves therein, whereby the motion of said arm within said space comprises, substantially, a reciprocating radial movement.

FELIX C. BLANCHA.